United States Patent
Cho et al.

(10) Patent No.: US 10,838,854 B2
(45) Date of Patent: Nov. 17, 2020

(54) DATA STORAGE DEVICE AND OPERATING METHOD THEREOF

(71) Applicant: SK hynix Inc., Gyeonggi-do (KR)

(72) Inventors: Young Ick Cho, Seoul (KR); Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 146 days.

(21) Appl. No.: 16/001,364

(22) Filed: Jun. 6, 2018

(65) Prior Publication Data

US 2019/0146910 A1   May 16, 2019

(30) Foreign Application Priority Data

Nov. 13, 2017  (KR) .................. 10-2017-0150575

(51) Int. Cl.
*G06F 3/00*  (2006.01)
*G06F 12/02*  (2006.01)
*G06F 3/06*  (2006.01)

(52) U.S. Cl.
CPC .......... *G06F 12/0246* (2013.01); *G06F 3/061* (2013.01); *G06F 3/0656* (2013.01); *G06F 3/0659* (2013.01); *G06F 3/0679* (2013.01); *G06F 2212/401* (2013.01); *G06F 2212/7201* (2013.01); *G06F 2212/7203* (2013.01)

(58) Field of Classification Search
None
See application file for complete search history.

(56) References Cited

FOREIGN PATENT DOCUMENTS

KR   1020120135216   12/2012

*Primary Examiner* — Midys Rojas
(74) *Attorney, Agent, or Firm* — IP & T Group LLP

(57) ABSTRACT

A data storage device may include a non-volatile memory device storing an address mapping table including a plurality of map segments and a controller including a random-access memory. The controller loads a compressed or non-compressed first map segment into the random-access memory based on meta-information of the first map segment in response to a read request received from a host device. The meta-information is stored in a map segment meta-information table stored in the random-access memory and the meta-information represents whether the map segments are compressible or not.

14 Claims, 10 Drawing Sheets

AMT

| Segment | Logical Address | Physical Address |
|---|---|---|
| S0 | LBA0 | PBA0 | ← L2P entry
|  | LBA1 | PBA1 |
|  | ⋮ | ⋮ |
|  | LBAm | PBAm |
| ⋮ | ⋮ | ⋮ |
| Sn | LBA0 | PBA0 |
|  | LBA1 | PBA1 |
|  | ⋮ | ⋮ |
|  | LBAm | PBAm |

FIG.4

SMT

| Segment | Y(1)/N(0) |
|---------|-----------|
| S0 | 0 |
| S1 | 1 |
| S2 | 1 |
| S3 | 0 |
| ⋮ | ⋮ |
| Sn-1 | 0 |
| Sn | 1 |

DATA STORAGE DEVICE AND OPERATING METHOD THEREOF

CROSS-REFERENCES TO RELATED APPLICATION

The present application claims priority under 35 U.S.C. § 119(a) to Korean patent application number 10-2017-0150575, filed on Nov. 13, 2017, which is incorporated herein by reference in its entirety.

BACKGROUND

1. Technical Field

Various embodiments relate generally to a semiconductor device and more particularly, to a data storage device and an operating method thereof.

2. Related Art

Recently, the paradigm of computer environments has been converted into ubiquitous computing systems used anytime and anywhere. Portable electronic devices such as cellular phones, digital cameras, notebook computers, etc., are widely used. A portable electronic device may include a data storage device using a memory device for storing data of the portable electronic device.

A data storage device using a memory device does not include a mechanical driving mechanism, thus, the data storage device exhibits improved stability and reliability over data storage devices using a mechanical driving mechanism. Furthermore, a data storage device using a memory device may have rapid access speed and low power consumption. Examples of a data storage device using a memory device for storing data include a universal serial bus (USB) memory card, a memory card including various interfaces, a universal flash storage (UFS) card, a solid sage drive (SSD) and the like.

SUMMARY

Example embodiments of the present disclosure provide a data storage device that compresses map data without degrading operational performance.

Example embodiments of the present disclosure also provide a method of operating the above-mentioned data storage device.

In an embodiment, a data storage device includes a non-volatile memory device storing an address mapping table including a plurality of map segments and a controller including a random-access memory. The controller loads a compressed or non-compressed first map segment into the random-access memory based on meta-information of the first map segment in response to a read request received from a host device. The meta-information is stored in a map segment meta-information table stored in the random-access memory and the meta-information represents whether the map segments are compressible or not.

In an embodiment, in a method of operating a data storage device, which includes a non-volatile memory device storing an address mapping table having a plurality of map segments, and a controller controlling operations of the non-volatile memory device, the method includes: determining whether to load a first map segment from the address mapping table when a read request and a logical address to be read are received from a host device; loading the first map segment, which is compressed or non-compressed, to load based on meta-information of the first map segment that is stored in a map segment meta-information table including the meta-information representing whether each of the map segments are compressible or not; and reading data stored at a physical address of the non-volatile memory device corresponding to the logical address to be read by referring to the loaded first map segment.

In an embodiment, a memory system includes a memory device storing a plurality of map segments representing relationships between logical addresses and physical addresses; and a controller including a random-access memory. The controller loads, in response to a request, one or more load segments among the map segments by selectively compressing one or more among the load segments according to the meta-information indicating whether or not compressed sizes of the respective map segments have a predetermined size or greater; and controls the memory device to perform an operation corresponding to the request by referring to the load segments.

In an embodiment, a data processing system includes a host apparatus; and a solid-state drive operatively coupled to the host apparatus, comprising a controller operatively couple to a plurality of non-volatile memory devices via dedicated communication channels, and a buffer memory device operatively coupled to the controller. Each non-volatile memory device is configured to store a plurality of map segments. The controller is configured to load a first map segment into the buffer memory for processing a read request received from the host apparatus; and determine whether or not to compress the first map segment based on meta-information of the first map segment stored in a map segment meta-information table, wherein the meta-information represents whether the map segments are compressible or not.

In an embodiment, a data storage device includes a non-volatile memory device configured to store a plurality of map segments; and a controller including a random-access memory. The controller loads a first map segment into the random-access memory for processing a read request received from a host device; determines whether or not to compress the first map segment based on meta-information of the first map segment stored in a map segment meta-information table; and reads data stored at a physical address of the non-volatile memory device corresponding to a logical address by referring to the loaded first map segment.

BRIEF DESCRIPTION OF THE DRAWINGS

FIG. 4 is an example of a map segment meta-information table;

DETAILED DESCRIPTION

Hereinafter, the present invention will be described below with reference to the accompanying drawings through various examples of embodiments. However, it is noted that the described examples are provided solely for the purpose of disclosing the invention and are not intended for limiting the scope of the invention. It should be understood by those skilled in the art to which the present invention pertains that the invention concepts disclosed in the present disclosure may be implemented not only as in the described embodiments but also in various other embodiments or variations thereof without departing from the spirit and scope of the invention.

It is noted that in describing the present disclosure, when it is determined that the detailed description of the known related art may obscure the gist of the present disclosure, the detailed description thereof will be omitted.

It is further noted that in the following description, numerous specific details are set forth in order to provide a thorough understanding of the present invention, however, the present invention may be practiced without some or all these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
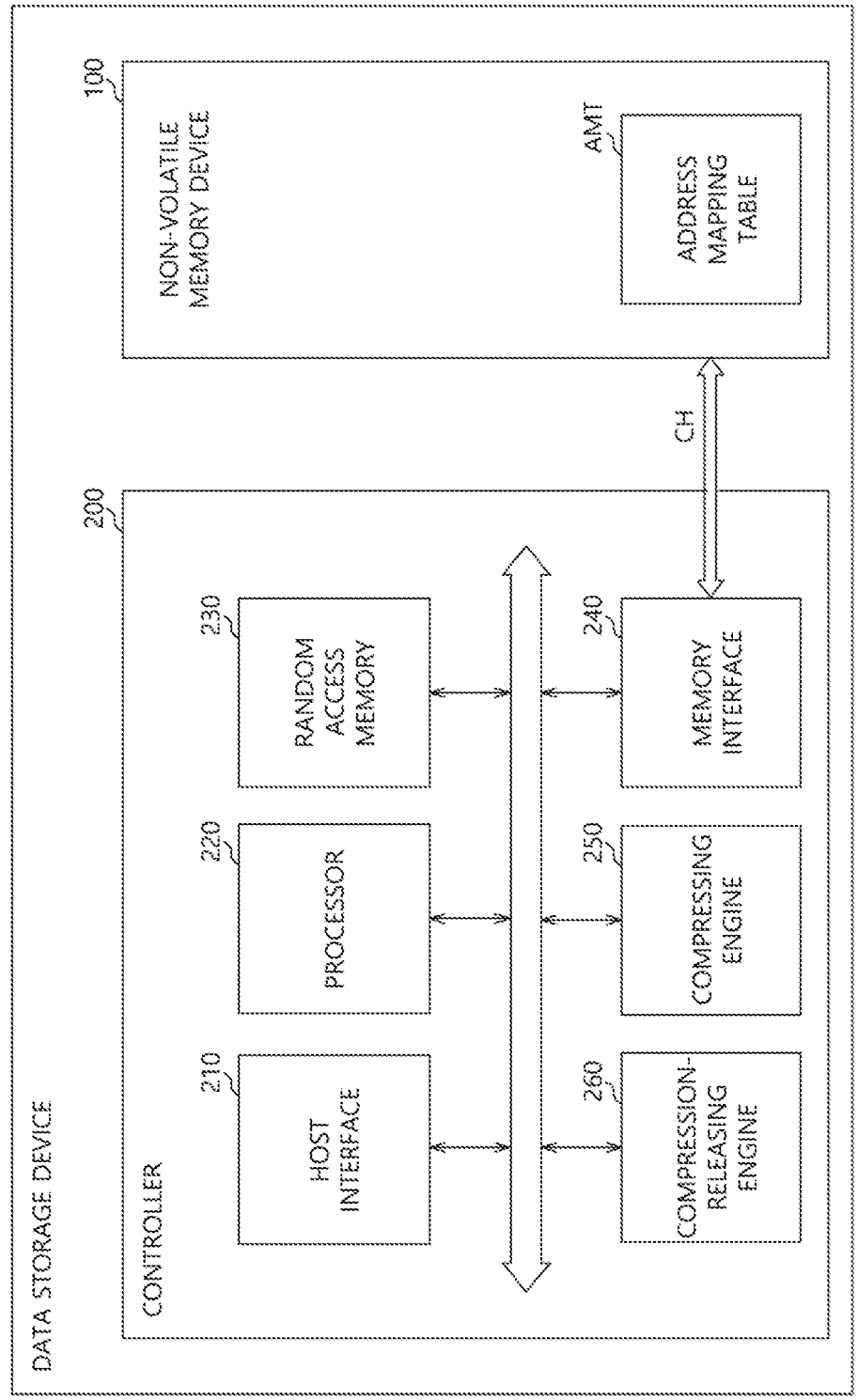
FIG. 1 is a block diagram illustrating a data storage device in accordance with an embodiment of the present disclosure.

FIG. 1 is a block diagram illustrating a data storage device 10 in accordance with example embodiments.

Referring to FIG. 1, a data storage device 10 of this example embodiment may be configured to store data accessed by a host device such as a cellular phone, an MP3 player, a laptop computer, a desktop computer, a game machine, a TV, an in-vehicle infotainment system, etc. The data storage device 10 may be referred to as a memory system.

The data storage device 10 may be implemented as various storage devices. Depending on a particular implementation the data storage device 10 may employ a different interface protocol for communicating with the host device. For example, various implementations of the data storage device 10 may include any one of a solid state drive (SSD), a multimedia card such as an MMC, an eMMC, an RS-MMC, a micro-MMC, etc., a secure digital card such as an SD, a mini-SD, a micro-SD, etc., a storage device such as a universal storage bus (USB), a universal flash storage (UFS), a personal computer memory card international association (PCMCIA), etc., a peripheral component interconnection card, a PCI-express (PCI-E) card, a compact flash (CF) card, a smart media card, a memory stack, and the like.

The data storage device 10 may have any one of various package structures, including, for example, a package-on-package (POP), a system-in-package (SIP), a system-on-chip (SOC), a multi-chip package (MCP), a chip-on-board (COB), a wafer-level fabricated package (WFP), a wafer-level stack package (WSP), etc.

The data storage device 10 may include a non-volatile memory device 100 and a controller 200 operatively coupled to each other via one or more communication channels CH. Any suitable communication channel may be used.

The non-volatile memory device 100 may be operated as a storage medium of the data storage device 10. The non-volatile memory device 100 may include a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase change random-access memory (PRAM) using chalcogenide compounds, a resistive random-access memory (RE-RAM) using a transition metal oxide compound, and the like.

In example embodiments, the data storage device 10 may include the single non-volatile memory device 100. Alternatively, the data storage device 10 may include a plurality of non-volatile memory devices. The plurality of non-volatile memory devices may be of the same type. The plurality of non-volatile memory devices may be of different type.

The non-volatile memory device 100 may include a memory cell array. The memory cell array may include memory cells arranged at intersected regions between word lines and bit lines. The memory cell array may include a plurality of memory blocks. Each of the memory blocks may include a plurality of pages.

For example, each of the memory cells may include a single level cell (SLC) configured to store one bit, a multi level cell (MLC) configured to store two bits, a triple level cell (TLC) configured to store three bits, a quadruple level cell (QLC) configured to store four bits, etc. The memory cell array 110 may include memory cells of at least one of the SLC, MLC, TLC and QLC type memory cells. The memory cell array 110 may have a two-dimensional structure or a three-dimensional structure.

The non-volatile memory device 100 may be configured to store an address mapping table AMT. The address mapping table AMT may include multiple entries, each entry mapping a logical block address LBA received from a host device to a corresponding physical block address PBA of the non-volatile memory device 100. A physical block address indicates an actual memory location of the non-volatile memory device. The terms physical block address and physical address are used herein interchangeably.

Figures 2, 3:
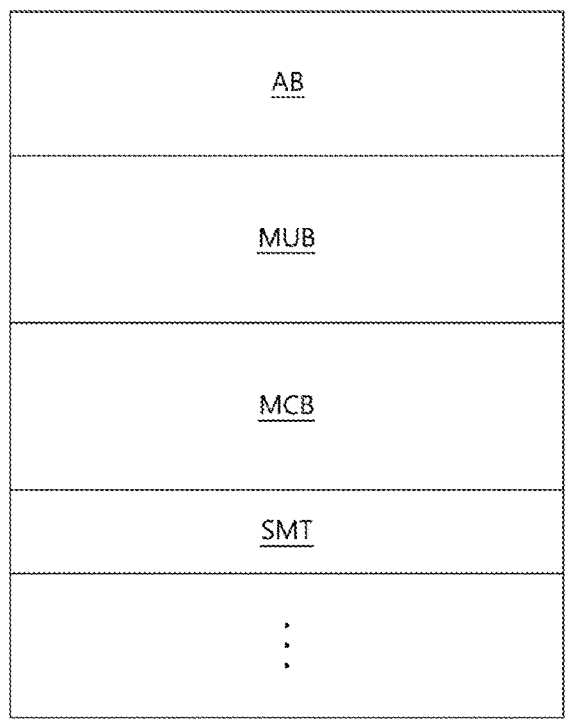
FIG. 2 is a schematic diagram illustrating an example of an address mapping table employed by the data storage device in FIG. 1.
FIG. 3 is a block diagram illustrating a random-access memory in FIG. 1.

FIG. 2 is an example of an address mapping table AMT employed by the data storage device 10 shown in FIG. 1.

Referring to FIG. 2, the address mapping table AMT may include a plurality of map segments S0 to Sn. Each of the map segments S0 to Sn may include a plurality of logical block addresses LBA0 to LBAm and a plurality of corresponding physical block addresses PBA0 to PBAm. A logical block address LBA and a corresponding physical block address PBA mapped to the logical block address LBA is referred to herein as a logical-to-physical (L2P) entry. Each of the map segments S0 to Sn may include m numbers of L2P entries.

An L2P entry of the address mapping table AMT may be updated. For example, an L2P entry may be updated whenever a sum of sizes of program data requested by the host device reach a predetermined size. Alternatively, when an address buffer AB (See FIG. 3) configured to store a physical-to-logical (P2L) entry is full of the P2L entries, the L2P entry in the address mapping table AMT may be updated. However, the updating time of the L2P entry in the address mapping table AMT may not be restricted at a specific time.

Referring back to FIG. 1, the controller 200 may include a host interface 210, a processor 220, a random-access memory 230, a memory interface 240, a compressing engine 250 and a decompression engine 260.

The host interface 210 may be configured to interface the host device with the data storage device 10 according to the corresponding protocols of the host device. For example, the host interface 210 may be communicated with the host device through any one of a USB, a UFS, an MMC, a parallel advanced technology attachment (PATA), a serial advanced technology attachment (SATA), a small computer system interface (SCSI), a serial attached SISI (SAS), a peripheral component interconnection (PCI) and a PCI-E.

The processor 220 may include a micro control unit (MCU) and a central processing unit (CPU). The processor 220 may be configured to process requests transmitted from the host device. To process the request transmitted from the host device, the processor 220 may drive the instructions or the algorithms stored in the random access memory 230. The instructions and/or the algorithms may be in the form of firmware in the random-access memory 230.

The random-access memory 230 may include a DRAM or an SRAM. The random-access memory 230 may be configured to store the firmware driven by the processor 220. The random-access memory 230 may be configured to store the data, for example, meta-data for driving the firmware. That is, the random-access memory 230 may be operated as a working memory of the processor 220.

The random-access memory 230 may be configured to temporarily store data transmitted from the host device to the non-volatile memory device 100 or data transmitted from the non-volatile memory device 100 to the host device. That is, the random-access memory 230 may be operated as a buffer memory.

FIG. 3 is a block diagram illustrating an example of the random-access memory 230 in FIG. 1.

Referring to FIG. 3, the random-access memory 230 may include an address buffer AB, a map update buffer MUB, a map cache buffer MCB and a map segment meta-information table SMT.

The address buffer AB may be configured to store an address provided along with a program request of the host device, i.e., the logical block address LBA, and an actual address of the non-volatile memory device 100 in which program data is to be stored, i.e., the physical block address PBA. This address information received from the host device together with the program request is stored as address mapping information referred to as a physical-to-logical entry P2L in the address buffer AB. The address mapping table AMT of the non-volatile memory device 100 may be updated based on the P2L entry in the address buffer AB.

The map update buffer MUB may be configured to temporarily store the L2P entries of the map segments to be updated among the map segments S0 to Sn in the address mapping table AMT of the non-volatile memory device 100. The physical block address PBA corresponding to each of the L2P entries stored in the map update buffer MUB may be changed to correspond to the P2L entries stored in the address buffer AB. The updating of the address mapping table AMT may be completed by writing the L2P entries having the changed physical block address PBA into the address mapping table AMT of the non-volatile memory device 100.

The map cache buffer MCB may be configured to cache the map data corresponding to the logical addresses provided along with recent and/or frequent requests from the host device. The map data cached by the map cache buffer MCB may include the L2P entries. The map data cached by the map cache buffer MCB may be or may not be compressed. When the map data can be compressed to a size of no more than a predetermined size, then the compressed map data are cached in the map cache buffer MCB. In contrast, when the map data cannot be compressed to a size of no more than a predetermined size, then the non-compressed map data having an original size are cached in the map cache buffer MCB.

The map segment meta-information table SMT may be configured to store information including whether the map segments S0 to Sn of the address mapping table AMT in the non-volatile memory device 100 are compressible or not. The information including whether the map segments S0 to Sn are compressible or not is referred to as meta-information. The map segment meta-information table SMT may store the meta-information in a form of a bit map table.

Although FIG. 3 depicts the map segment meta-information table SMT stored in a separately allotted region in the random-access memory 230, the region storing the map segment meta-information table SMT may not be restricted within a specific region. For example, the map segment meta-information table SMT may be stored in one region, which may be allotted for storing various meta-information, together with the meta-information without the allotment of the separated region for storing the map segment meta-information table SMT in the random-access memory 230.

Figure 4:
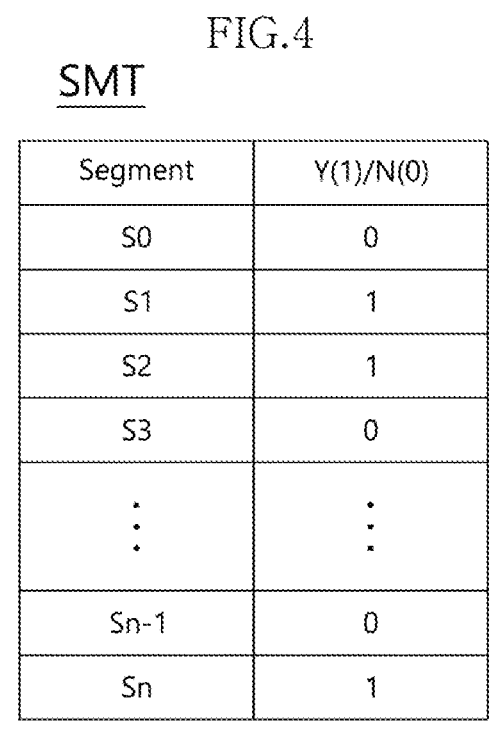

FIG. 4 is a block diagram illustrating an example of the map segment meta-information table SMT.

Referring to FIG. 4, the map segment meta-information table SMT may store the numbers of the map segments S0 to Sn and the meta-information of the map segments S0 to Sn, i.e., the information that the map segments are compressible or the information that the map segments are not compressible. For example, a bit '1' may indicate that a map segment is compressible and a bit '0' may indicate that a map segment is not compressible. When loading of a specific map segment is required, the processor 220 may determine whether the map segment is compressible or not based on the map segment meta-information table SMT.

Referring back to FIG. 1, the memory interface 240 may control the non-volatile memory device 100 in accordance with the controls of the processor 220. The memory interface 240 may be referred to as a memory controller. The memory interface 240 may provide the non-volatile memory device 100 with control signals. The control signals may include commands, addresses, etc., for controlling the non-volatile memory device 100. The memory interface 240 may provide the non-volatile memory device 100 with data or receive data from the non-volatile memory device 100. The memory interface 240 may connect with the non-volatile memory device 100 through the communication channel CH. The communication channel CH may include at least one signal line.

The compressing engine 250 may be configured to read and compress one or more map segments in the address mapping table AMT of the non-volatile memory device 100 under the control of the processor 220. The compressing engine 250 may be configured to output one or more of the compressed map segments to the random-access memory 230. The compressed map segments may be cache in the map cache buffer MCB of the random-access memory 230.

For example, during an update of the address mapping table AMT stored in the non-volatile memory device 100, the compressing engine 250 may compress updated map segments under the control of the processor 220. The compressing engine 250 may determine whether sizes of the compressed map segments are no more than the predetermined size or not. The compressing engine 250 may provide the processor 220 with the information including whether the map segments are compressible or not based on the determination results. The processor 220 may store or renew the meta-information of the map segments in the map segment meta-information table SMT including whether the map segments are compressible or not based on information provided from the compressing engine 250.

The decompression engine 260 (also referred to as a compression releasing engine) may be configured to decompress the compressed map segments among the cached map segments in the map cache buffer MCB. The processor 220 may control the non-volatile memory device 100 to read the data of the address requested by the host device based on the decompressed map data.

Figure 5:
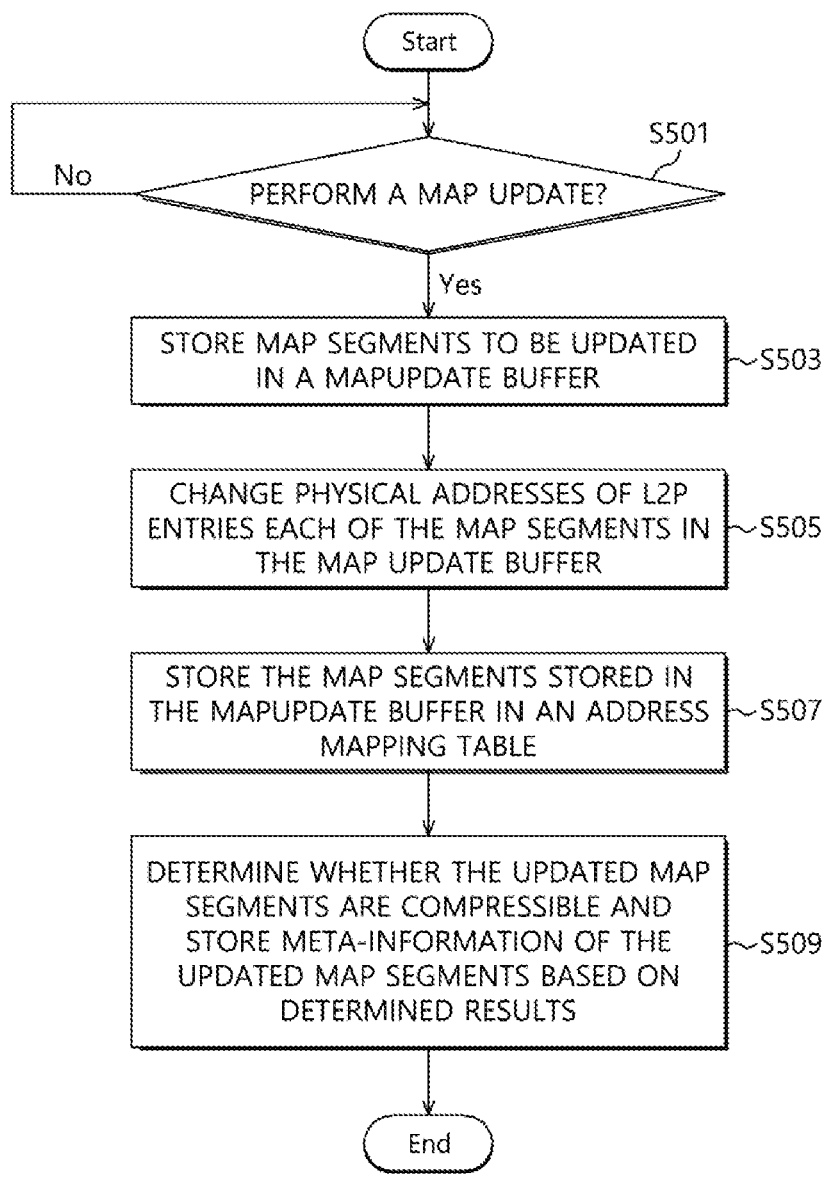
FIG. 5 is a flow chart illustrating a map update operation in a method of operating a data storage device in accordance with an embodiment of the present disclosure.

FIG. 5 is a flow chart illustrating a map update operation of the data storage device 10 in accordance with an embodiment of the present disclosure.

Referring to FIGS. 1 to 5, in step S501, the processor 220 of the controller 200 may determine whether or not to perform a map update. When the address buffer AB of the random-access memory 230 becomes full of the P2L entries (not having an empty space), or the cumulative size of the program data received from the host device reaches a predetermined size, the processor 200 may then perform a map update for updating the address mapping table AMT in the non-volatile memory device 100.

If it is determined that the map update should be performed ('Yes' at step S501), the process may proceed to step S503.

In step S503, the processor 220 may control the non-volatile memory device 100 to read and transmit map segments to be updated among the map segments S0 to Sn from the address mapping table AMT of the non-volatile memory device 100. When the map segments to be updated are received from the non-volatile memory device 100, the received map segments may be stored in the map update buffer MUB of the random-access memory 230.

In step S505, the processor 220 may change the physical block address PBA of an L2P entry of the map segments to be updated that are stored in the map update buffer MUB of the random-access memory 220 to correspond to an P2L entry in the address buffer AB.

In step S507, the processor 220 may control the non-volatile memory device 100 to store the map segments having the changed physical block address PBA in the map update buffer MUB in a corresponding region of the address mapping table AMT of the non-volatile memory device 100, thereby the update of the address mapping table AMT may be completed.

In step S509, the processor 220 may control the compressing engine 250 to determine whether or not it is possible to compress each of the updated map segments and to provide the results of the determination. The compressing engine 250 may compress the updated map segments transmitted to the non-volatile memory device 100 under the control of the processor 220. The compressing engine 250 may compare the sizes of the compressed map segments with the predetermined size to determine whether or not the map segments are compressible. The compressing engine 250 may provide the processor 220 with the information including the determined results. The processor 220 may store or renew the meta-information of the map segments in the map segment meta-information table SMT based on the information of the map segments provided from the compressing engine 250.

Figure 6:
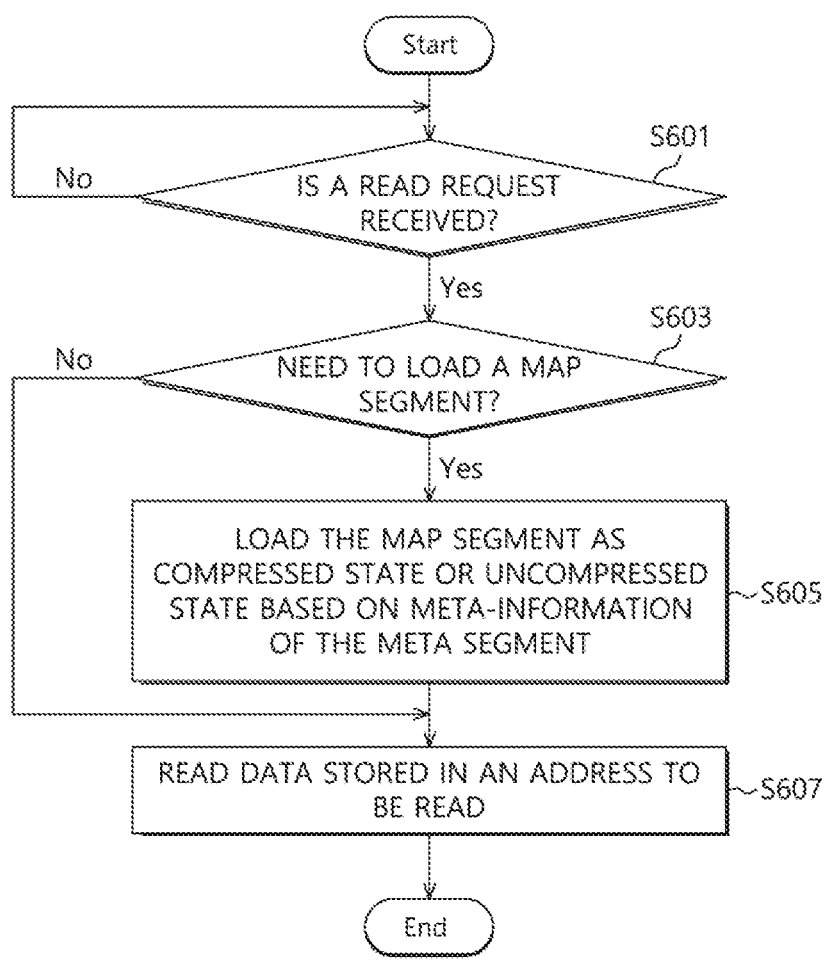
FIG. 6 is a flow chart illustrating a map-compressing operation in a method of operating a data storage device in accordance with an embodiment of the present disclosure.

FIG. 6 is a flow chart illustrating a map-compressing operation of the data storage device 10 in accordance with example embodiments.

Referring to FIG. 6, in step S601, the processor 220 may determine whether a read request is received or not from the host device. A read address may also be received together with the read request.

When the read request is received ('Yes' at step S601), in step S603, the processor 220 may determine whether or not to load a map segment. For determining whether to perform loading of a map segment, the processor 220 may scan the map cache buffer MCB to identify an L2P entry, which corresponds to the read address, i.e., the logical block address received from the host device, cached in the map cache buffer MCB.

When the L2P entry corresponding to the read address is cached in the map cache buffer MCB, the processor 220 may determine that the loading of the map segment is not necessary. In contrast, when the L2P entry corresponding to the read address is not cached in the map cache buffer MCB, the processor 220 may determine that it is necessary to load the map segment including the L2P entry, which corresponds to the read address, from the address mapping table AMT of the non-volatile memory device 100.

When the loading of the map segment is determined as not necessary ('No' at step S603), step S607 may be performed as described later.

When the loading of the map segment is determined as necessary ('Yes' at step S603), in step S605, the processor 220 may identify the meta-information based on the map segment meta-information table SMT of the random-access memory 230. The processor 220 may compress and load the map segment by using the compressing engine 250 or only load the map segment without the compression based on the meta-information. The map segment meta-information table SMT may store the meta-information representing whether the map segments are compressible or not as a bit of '1' or '0'.

When the meta-information of the loaded map segment indicating that the loaded map segment is compressible, then the processor 220 may compress the map segment using the compressing engine 250 and the processor 220 may allot a space for the compressed map segment to the map cache buffer MCB. The compressed map segment may be stored in the allotted space in the map cache buffer MCB. When the meta-information of the loaded map segment indicates that the loaded map segment is not compressible, then the processor 220 does not compress the map segment and the processor 220 allots a space for the original map segment to the map cache buffer MCB. The original map segment may then be stored in the allotted space in the map cache buffer MCB. For example, the meta-information of the loaded map segment may be '1' indicating that the loaded map segment is compressible, or may be '0' indicating that the loaded map segment is not compressible.

When loading of the map segment which contains the L2P entry corresponding to the read address is not necessary, in step S607, the processor 220 may identify the physical block address PBA corresponding to the read address, i.e., the logical block address LBA based on the corresponding L2P entry of the map segment in the map cache buffer MCB. Then the processor 220 may control the non-volatile memory device 100 to read the data from the identified physical block address. When the map segment is compressed, the processor 220 may decompress the compressed map segment using the decompression engine 260 and the processor 220 may identify the physical block address corresponding to the read address based on the decompressed map segment.

Figure 7:
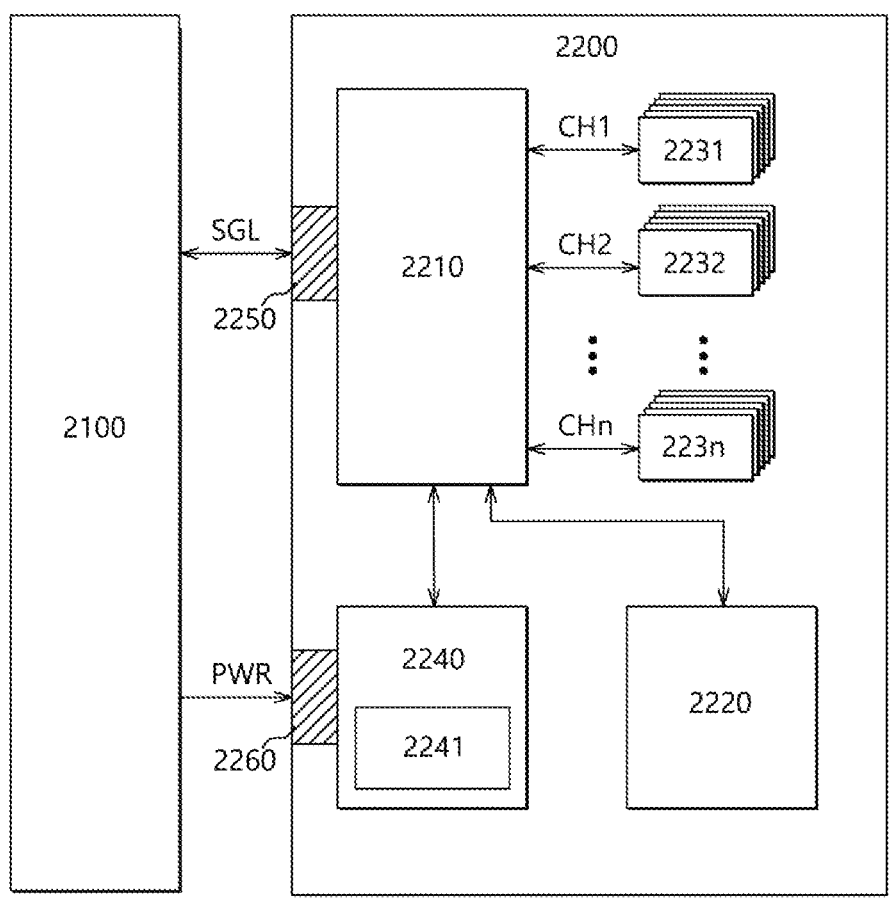
FIG. 7 is a diagram illustrating an example of a data processing system including a solid-state drive (SSD) in accordance with an embodiment of the present disclosure.

FIG. 7 is a diagram illustrating an example of a data processing system including a solid state drive (SSD) in accordance with an embodiment. Referring to FIG. 7, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260. The non-volatile memory devices 2231 to 223n may each be the same as the non-volatile memory device 100 of FIG. 1. The controller 2210 may be the same as controller 200 of FIG. 1.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 8:
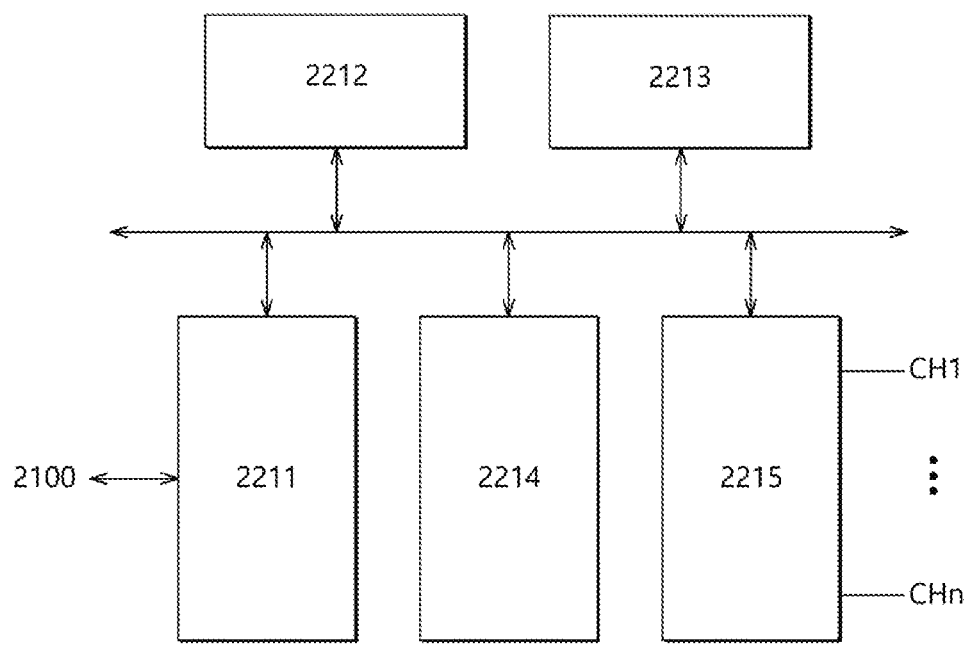
FIG. 8 is a diagram illustrating an example of a controller illustrated in FIG. 7.

FIG. 8 is a diagram illustrating an example of the controller 2210 of FIG. 7. Referring to FIG. 8, the controller 2210 may include a host interface unit 2211, a control unit 2212, a random-access memory (RAM) 2213, an error correction code (ECC) unit 2214, and a memory interface unit 2215. The controller 2210 may further include a compressing engine, and a decompression engine the same as the compressing engine 250, and decompression engine 260 of the controller 200 of FIG. 1.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 9:
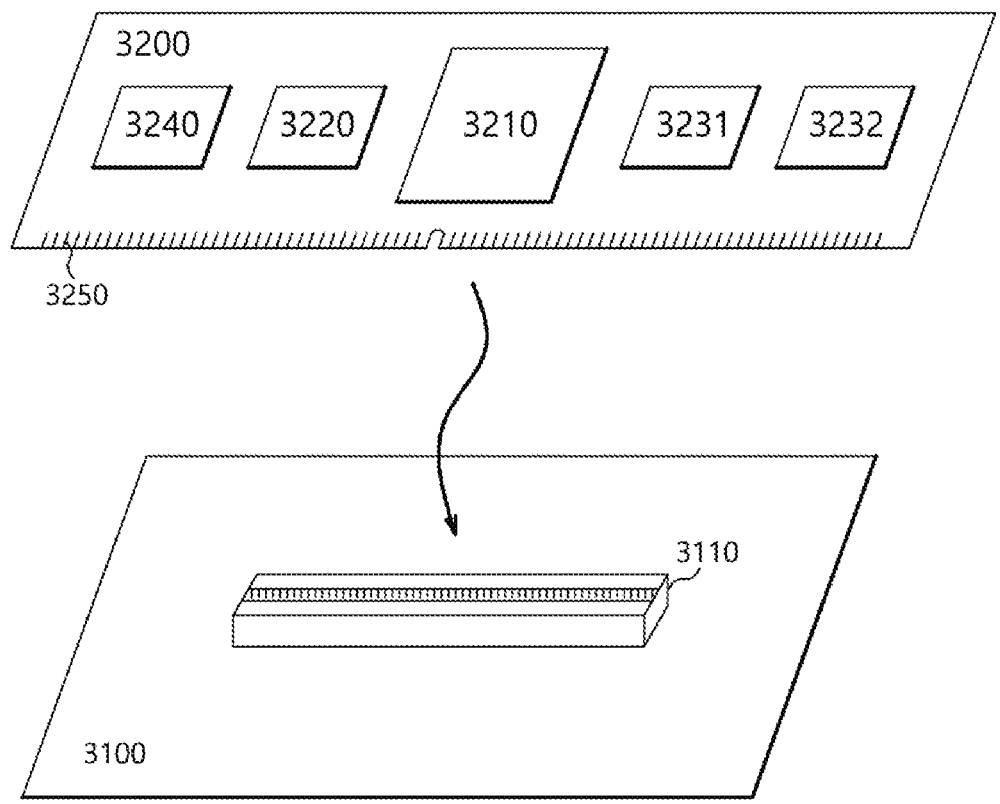
FIG. 9 is a diagram illustrating an example of a data processing system including a data storage apparatus in accordance with an embodiment of the present disclosure.

FIG. 9 is a diagram illustrating an example of a data processing system including a data storage apparatus according to an embodiment. Referring to FIG. 9, a data processing system 3000 may include a host apparatus 3100 and a data storage apparatus 3200.

The host apparatus 3100 may be configured in a board form such as a printed circuit board (PCB). Although not shown in FIG. 9, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 8.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200. The nonvolatile memory devices 3231 and 3232 may each include an address mapping table AMT as described in the embodiment of FIG. 1.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 10:
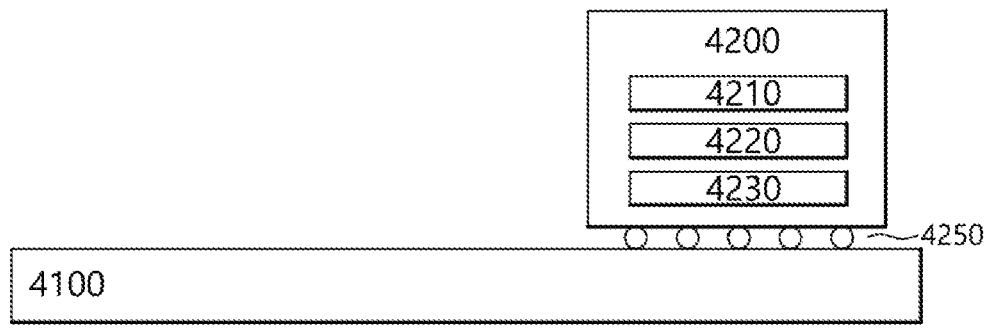
FIG. 10 is a diagram illustrating an example of a data processing system including a data storage apparatus in accordance with an embodiment of the present disclosure.

FIG. 10 is a diagram illustrating an example of a data processing system including a data storage apparatus in accordance with an embodiment. Referring to FIG. 10, a data processing system 4000 may include a host apparatus 4100 and a data storage apparatus 4200.

The host apparatus 4100 may be configured in a board form such as a PCB. Although not shown in FIG. 10, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200. The nonvolatile memory device 4230 may include an address mapping table AMT as in the embodiment of FIG. 1

Figure 11:
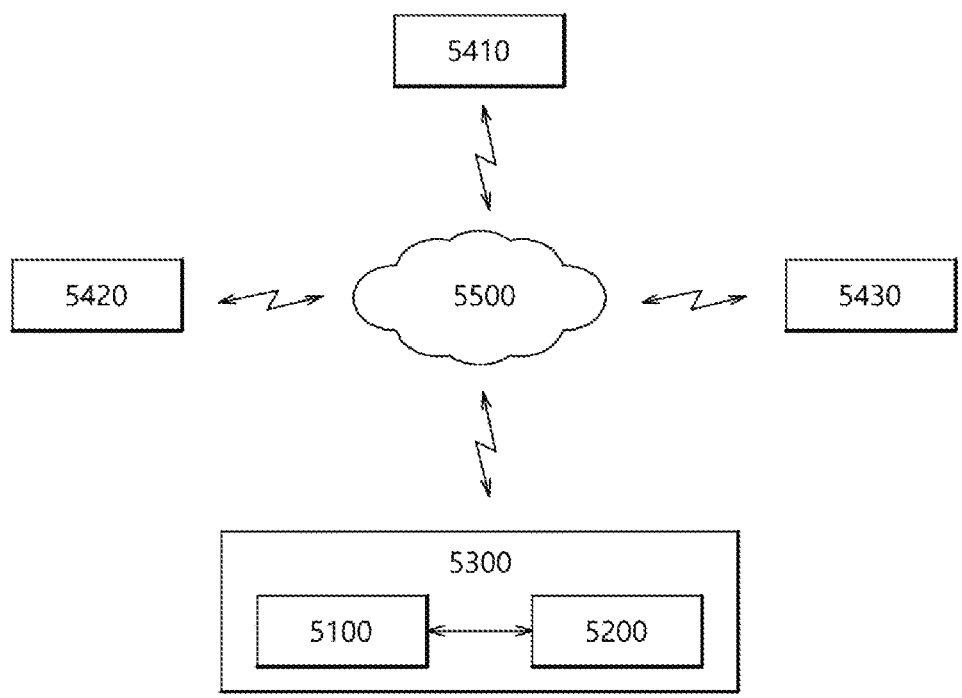
FIG. 11 is a diagram illustrating an example of a network system including a data storage apparatus in accordance with an embodiment of the present disclosure.

FIG. 11 is a diagram illustrating an example of a network system 5000 including a data storage apparatus in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured as the data storage apparatus 10 of FIG. 1, the data storage apparatus 2200 of FIG. 7, the data storage apparatus 3200 of FIG. 9, or the data storage apparatus 4200 of FIG. 10.

Figure 12:
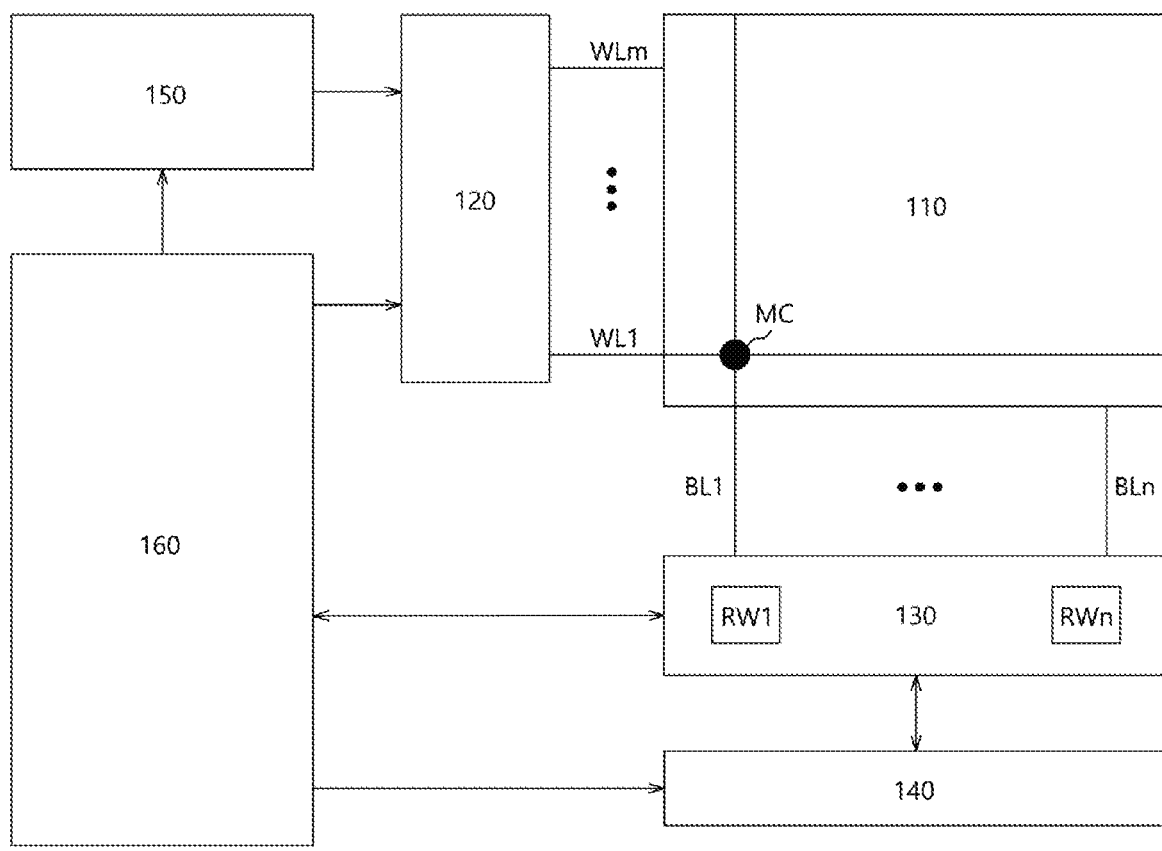
FIG. 12 is a block diagram illustrating an example of a nonvolatile memory device included in a data storage apparatus in accordance with an embodiment of the present disclosure.

FIG. 12 is a block diagram illustrating an example of a nonvolatile memory device included in a data storage apparatus in accordance with an embodiment. Referring to FIG. 12, a nonvolatile memory device 100 may include a memory cell array 110, a row decoder 120, a column decoder 140, a data read/write block 130, a voltage generator 150, and a control logic 160. The memory device may also include an address mapping table as described in the embodiment of FIG. 1.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100. The above embodiments of the present disclosure are illustrative and not limitative. For example, the present disclosure is not limited to any specific type of semiconductor device. Various alternatives, additions, subtractions, modifications and equivalents of the described embodiments are possible without departing from the scope and spirit of the scope of the invention as defined in the appended claims.

What is claimed is:

1. A data storage device comprising:
   a non-volatile memory device storing an address mapping table including a plurality of map segments; and
   a controller including a random-access memory and configured to load a first map segment among the plurality of map segments from the non-volatile memory device in response to a read request received from a host device into the random-access memory in a compressed state or an non-compressed state based on meta-information of the first map segment,
   wherein the meta-information is stored in a map segment meta-information table stored in the random-access memory and the meta-information represents whether the plurality of map segments are compressible or not.

2. The data storage device of claim 1, wherein the controller comprises:
   a compressing engine configured to compress the plurality of map segments, compare a size of each of the compressed map segments with a predetermined size to determine whether each of the plurality of map segments is available to be loaded in the compressed state or the non-compressed state based on a result of the comparison, and output a result of the determination to a processor; and
   the processor configured to store the meta-information corresponding to each of the plurality of map segments in the map segment meta-information table based on the result of the determination received from the compressing engine.

3. The data storage device of claim 1, wherein the random-access memory comprises:
   an address buffer configured to store mapping information of a logical address, to be programmed, received from the host device and a physical address in which data are stored in the non-volatile memory device;
   a map update buffer configured to load a map segments to be updated among the plurality of map segments; and
   a map cache buffer configured to cache map data corresponding to the logical address received from the host device.

4. The data storage device of claim 3, wherein the processor is further configured to:
   read, when the address mapping table is updated, the map segments to be updated among the plurality of map segments;
   store the read map segments to be updated in the map update buffer;
   change the mapping information of the map segments stored in the map update buffer based on the mapping information stored in the address buffer; and
   program the map segments having the changed mapping information in a corresponding region of the address mapping table.

5. The data storage device of claim 4, wherein the processor is further configured to control the compressing engine to compress the map segments having the changed mapping information, compare a size of the compressed map segments having the changed mapping information with the predetermined size and determine whether the map segment having the changed mapping information is compressible or not based on a result of the comparison.

6. The data storage device of claim 3, wherein the controller is further configured to:
   identify whether the first map segment including the logical address corresponding to the read request is stored in the map cache buffer; and
   read the first map segment from the address mapping table of the non-volatile memory device when the first map segment is not stored in the map cache buffer.

7. A method of operating a data storage device, which include a non-volatile memory device storing an address mapping table including a plurality of map segments, and a controller controlling operations of the non-volatile memory device, the method comprising:
   loading a first map segment among the plurality of map segments from the non-volatile memory device in response to a read request and a logical address received from a host device into a random-access memory of the controller in a compressed state or an non-compressed state based on meta-information of the first map segment; and
   reading data stored at a physical address of the non-volatile memory device corresponding to the logical address by referring to the loaded first map segment,
   wherein the meta-information is stored in a map segment meta-information table stored in the random-access memory and the meta-information represents whether the plurality of map segments are compressible or not.

8. The method of claim 7, further comprising:
   determining whether or not the first map segment including the logical address is cached in a map cache buffer, and
   wherein the loading of the first map segment is performed when the first map segment is not cached in the map cache buffer.

9. The method of claim 7,
   wherein the loading of the first map segment comprises:
   compressing the first map segment and loading the compressed first map segment when the meta-information corresponding to the first map segment to be loaded indicates the first map segment as compressible; and
   loading the first map segment without compression when the meta-information corresponding to the first map segment indicates the first map segment as not compressible.

10. The method of claim 7, wherein the random-access memory further comprises:
    an address buffer configured to store mapping information of a logical address, to be programmed, received from the host device and a physical address in which data are stored in the non-volatile memory device; and
    a map update buffer configured to load map segments to be updated among the map segments.

11. The method of claim 10, further comprising:
determining whether to perform an update for the address mapping table;
storing a map segment to be updated among the map segments in the map update buffer;
changing mapping information of the map segment stored in the map update buffer based on the mapping information stored in the address buffer;
programming the map segment having the changed mapping information in corresponding a region of the address mapping table;
determining whether compression is available for the map segment having the changed mapping information; and
storing meta-information for the map segment in the map segment meta-information table based on a determined result.

12. The method of claim 11, wherein the determining of whether compression is available for the map segments having the changed mapping information comprises:
compressing the map segment having the changed mapping information;
comparing a size of the compressed map segment with a predetermined size;
determining that the map segment is compressible when the size of the compressed map segment is smaller than the predetermined size; and
determining that the map segment is not compressible when the size of the compressed map segment is greater than the predetermined size.

13. A memory system comprising:
a memory device storing a plurality of map segments representing relationships between logical addresses and physical addresses; and
a controller including a random-access memory and suitable for:
loading one or more first map segments among the plurality of map segments from the memory device in response to a request received from a host device into the random-access memory by selectively compressing the first map segments according to the meta-information indicating whether or not compressed sizes of the respective map segments have a predetermined size or greater; and
controlling the memory device to perform an operation corresponding to the request by referring to the loaded first map segments.

14. The memory system of claim 13, the controller is further suitable for updating the meta-information stored in the random-access memory, when the map segments are updated.

* * * * *